United States Patent [19]

Gariepy et al.

[11] Patent Number: 5,145,514
[45] Date of Patent: Sep. 8, 1992

[54] TREATING ALUMINIUM WITH CHLORINE

[75] Inventors: Bruno Gariepy, Chicoutimi; Ghyslain Dube, Jonquiere, both of Canada

[73] Assignee: Alcan International Limited, Montreal, Canada

[21] Appl. No.: 657,876

[22] Filed: Feb. 19, 1991

Related U.S. Application Data

[63] Continuation of Ser. No. 463,919, Jan. 10, 1990, abandoned, which is a continuation of Ser. No. 40,602, Apr. 21, 1987, abandoned, which is a continuation-in-part of Ser. No. 795,635, Nov. 6, 1985, abandoned.

[30] Foreign Application Priority Data

Nov. 8, 1984 [GB] United Kingdom ............... 8428251

[51] Int. Cl.$^5$ ............................................. C22B 21/06
[52] U.S. Cl. ...................................... 75/681; 420/542
[58] Field of Search .......................... 75/681; 420/542

[56] References Cited

U.S. PATENT DOCUMENTS

| | | | |
|---|---|---|---|
| 1,896,201 | 2/1933 | Sterner-Rainer | 75/68 R |
| 3,958,980 | 5/1976 | Szekely | 75/68 R |
| 4,354,869 | 10/1982 | Hummer et al. | 75/68 R |
| 4,392,888 | 7/1983 | Eckert et al. | 75/93 E |

FOREIGN PATENT DOCUMENTS 354114 12/1979 Austria.
0142727 5/1985 European Pat. Off..

OTHER PUBLICATIONS

Kästner et al., "Raffination von Hüttenaluminium...", *Raffinationsverfahren Metall., Int. Symp.* 1983, pp. 35-54.

*Primary Examiner*—Melvyn J. Andrews
*Attorney, Agent, or Firm*—Cooper & Dunham

[57] ABSTRACT

When molten aluminium is treated with chlorine to remove alkali and alkaline earth metals and hydrogen, there is formed a brittle oxide crust which does not protect the metal from oxidation. This problem is solved by admixing with the chlorine a minor proportion of a gaseous compound of fluorine, preferably sulphur hexafluoride, which can form alkali or alkaline earth metal fluorides in the presence of molten aluminium. The proportion of sulphur hexafluoride to chlorine gas is preferably from 0.01 to 1.0. Ingots cast using the treated metal are free of oxide patches on their surface.

6 Claims, No Drawings

TREATING ALUMINIUM WITH CHLORINE

This is a continuation of application Ser. No. 463,919, filed Jan. 10, 1990, now abandoned which is a continuation of application Ser. No. 040,602 filed Apr. 21, 1987 now abandoned, which is a continuation-in-part of application Ser. No. 795,635 filed Nov. 6, 1985 now abandoned.

The presence of alkali metals in aluminium alloys, especially Al-Mg alloys, is known to cause cracking during sheet ingot rolling. This is particularly true of sodium for which concentrations as low as a few ppm only can reduce formability under heated conditions (plasticity), and cause edge cracking during rolling operations. Hydrogen dissolved in molten aluminium can also cause cracking problems during rolling as well as defects in the finished products.

In conventional practice, gas fluxing is used to remove impurities from molten aluminium prior to casting. The gas is composed of an inert carrier (e.g. argon or nitrogen) mixed with a reactive gas, usually chlorine, in varying proportions. Degassing should be done in the shortest time possible before solidification, in order to avoid hydrogen reabsorption into the metal, due to burner combustion products of the reverberatory furnaces generally used in the aluminium industry.

In an attempt to reduce atmospheric pollution caused by chlorine gas and its reaction products with molten aluminium (HCl), furnace fluxing is replaced more and more by continuous treatment units located between the furance and the casting station. These commercial in-line units (described in U.S. Pat. Nos. 3,839,019; 3,743,263; 4,426,068; 4,177,065; 4,177,066) are characterized by a very efficient gas dispersion system which guarantees an almost complete reaction between the chlorine gas and the alkali elements, thus reducing the generation of polluting gases.

Because these continuous treatment units produce such a successful gas/liquid mixture, a fine alkali metal chloride dispersion is formed and can be observed, in suspension in the molten aluminium, during Al-Mg alloy treatment.

This fine alkali chloride dispersion is mainly composed of $MgCl_2$, with traces of NaCl, LiCl, $CaCl_2$. It can be seen as a thin film or as droplets around fine argon bubbles generated by the gas dispersion systems of the in-line treatment units.

Because their size is so small, typically 25 micrometers or less, and because there is little density difference with aluminium, these fine salt and alkali mixture droplets are relatively stable in the melt. They can be observed in the metal leaving the in-line treatment units. Since they are so small and due to turbulence in the liquid metal mainly caused by convection currents, metal flow and gas injection, these particles have long residence time in the melt. They can therefore be found in the metal leaving the transfer trough and even into the ingot casting mould. The coarse fibreglass filters normally used for molten metal filtration do not provide an adequate barrier for the removal of these alkali chlorine particles. They accumulate on the surface of the metal flowing through the troughs and ultimately reach metal surface inside casting moulds.

When these alkali chloride particles reach the air/liquid aluminium interface, a radical transformation occurs in the characteristics of the oxide film. A porous, hard and brittle layer, "crunchy crust", is formed on the metal surface.

As opposed to the thin, flexible, and protective oxide film normally found on the surface of aluminium alloys, this oxide film, modified by chloride emulsion, has no protective characteristic and will continue to grow in thickness as long as fine chloride particles are produced in the aluminium. The importance of this phenomenon depends on the amount of chlorine injected into the metal and will continue as long as the treatment lasts.

When this phenomenon takes place on the metal surface inside the casting moulds, the oxide crust behaves differently and can cause serious problems during the solidification process. The oxide film on the molten metal surface inside the D.C. mould loses its flexibility, tends to thicken and detach itself erratically, and is then carried away by the metal flow onto the ingot side. As mentioned earlier, the porosity, hardness and thickness of this oxide crust as compared to the thin and flexible film normally found on aluminium alloys during casting, can cause surface as well as sub-surface defects which interfere with casting and subsequent rolling operations. This is particularly true when oxide patches are formed near the D.C. mould corners causing tearing (cold shuts) and seriously deteriorating the surface and sub-surface quality of the ingot.

It was also noted that this porous and non-self-protecting oxide on the metal surface and inside the casting mould caused the accumulation of non-metallic inclusions below the molten metal surface which, when carried onto the ingot walls, can cause defects such as thick oxide patches requiring the removal of a certain metal thickness by scalping prior to hot rolling.

Although the complex phenomena causing this type of oxide formation on the surface of Al-Mg alloys are not fully understood, we do know however, through chemical and physical analysis, that fine alkaline earth metal chloride particles present in the melt especially $MgCl_2$ formed when high magnesium aluminium alloys are chlorine fluxed using effective gas dispersers, are responsible for the change in behaviour of the oxide film characteristics.

Several methods and techniques have been proposed to eliminate the oxide patches problems encountered when in-line chlorination of high magnesium alloy is carried out before casting:

a) The addition of beryllium metal, even in trace quantity as low as 5–10 ppm Be to Al-Mg alloys minimizes the problem of thick oxide film growth and oxide patches after in-line chlorination.

However, due to high beryllium toxicity, this practice is not acceptable particularly for alloys used for beverage and food cans manufacturing.

b) In-line metal filtration to remove the fine particulates of magnesium chloride emulsion immediately after in-line chlorine treatment of Al-Mg alloys can be effective for eliminating the formation of oxide patches. However, this solution is not practical for several reasons. First the removal by filtration of fine salt particulates, which are molten at the temperature of casting is not very effective. The melting point of magnesium chloride is approximately 715° C. Under practical operating conditions, magnesium chloride is mixed with other alkali metal chlorides (e.g. Nacl, $Cacl_2$, LiCl, etc.) which lower substantially its melting point below the usual casting temperature (range of 690°–720° C.). Second, these fine liquid particulates of lower density relatively to the molten aluminium have a strong tendency to escape regular filter packing. For this reason, conventional filter design is not entirely adequate to eliminate down stream metal contamination. In addition, such in-line metal filtration systems cost in excess of $5.00/t Al to operate.

Special filter systems, specially designed to capture and retain salt particles of lower density relatively to molten aluminium, have been described in U.S. Pat. No. 4,390,364. These systems required relatively large volumes of molten aluminum to be held which make the total in-line system not very flexible and rather expensive to operate, particularly when frequent alloy changes are required.

c) U.S. Pat. No. 3,854,934 describes the use, instead of chlorine, of a fully halogenated hydrocarbon where the halogen atoms are chlorine or fluorine. The halogenated hydrocarbon gas is passed through the molten metal which is provided with a supernatant flux layer to absorb the non-metallic particles. Although halogenated hydrocarbon gas such as $CF_2Cl_2$ (Freon-12) was shown to be effective for the removal of alkali trace elements, gas and oxides, the process tends to do so at the expense of formation of additional impurities, namely carbides of aluminium and of other elements. Carbide formation associated with the use of halocarbon has limited its acceptance in the aluminium processing applications. Attempts have been made to solve carbide formation with the combined use of halogenated hydrocarbon with oxygen and fluorine acceptors which will prevent the formation of carbon tetrafluoride. Such a system is described in U.S. Pat. No. 4,392,888. But, this system is relatively complex, has very narrow operating range, is expensive to operate and for these reasons has not displaced the utilization of chlorine gas systems from commercial use.

It is an object of this invention to provide a way to reduce or eliminate the problem of oxide patches when casting high magnesium aluminium alloys using an in-line chlorination system which is more effective and economical compared with the other techniques described above.

It was found that by mixing a fluorinated gas (except halocarbon) which can be decomposed at the temperature of molten aluminium and its alloys with chlorine, with or without the presence of an inert gas carrier, such as argon, nitrogen, or any other inert gas in contact with molten metal, the problems encountered with the transformation of the oxide films and the formation of the oxide patch problems during casting can be completely eliminated.

The fluorine gaseous compound should be less stable compared to the corresponding alkali or alkaline earth metal fluoride such as to decompose upon its introduction into the aluminium and give rise to the formation of magnesium fluoride and/or other alkali and alkaline earth metal fluoride compounds. The preferred gaseous fluorine compounds are preferably selected among compounds which do not generate undersirable contamination or induce inclusion formation.

Silicon tetrafluoride ($SiF_4$) is an acceptable fluorine compound which will generate in situ alkali metal fluoride formation and can be used provided the addition of silicon is not objectionable from the quality viewpoint of the aluminium or alloy produced. It was also found that sulphur hexafluoride ($SF_6$), when mixed with the chlorine and optionally neutral carrier gas, in various proportions for the in-line treatment of liquid AlMg alloys is very effective to completely eliminate the problems encountered when using chlorine and neutral gas carrier only. Contrary to the utilization of chlorine alone, in different concentrations with a neutral gas carrier, $SF_6$ mixed with chlorine gives a thin, flexible and protective oxide film layer which inhibits the formation of the porous and solid oxide crust normally encountered when using chlorine and neutral gas carrier for in-line metal treatment.

The analysis of this protective oxide film shows the presence of $MgF_2$, which indicates that $SF_6$ has been decomposed and that magnesium fluoride is an important element for the protection of the oxide film.

The present invention thus provides a method of treating molten aluminium by contacting it with chlorine gas, characterized by also contacting the molten metal with a gaseous compound of fluorine, other than a halogenated hydrocarbon, which can form alkali or alkaline earth metal fluorides in the presence of molten aluminium in an amount such that any oxide formed on the surface of the metal takes the form of a coherent film which protects the metal from further oxidation and prevents the formation of surface and subsurface defects on the ingot surface and top during casting operations.

The term aluminium is used here to cover the element Al itself and also alloys of which Al is the major component. The invention is of particular importance in relation to magnesium-rich alloys, for example those of the 5000 series of the Aluminum Association Register.

The purpose of the treatment is to remove unwanted alkali metals (particularly lithium and sodium, and also calcium) and hydrogen from the melt (together with any solid particulate inclusions present), and the combined amounts of chlorine and the fluorine compound should be stoichiometrically sufficient for this purpose. It is preferred to provide enough chlorine for this purpose, and to include the fluorine compound (e.g. $SF_6$) in an amount sufficient to promote the formation of a coherent protective oxide film in place of the brittle non-protective crust formed in its absence and to eliminate completely oxide patch formation on the ingot surface and subsurface which occurs inside the ingot casting mound. For this purpose, the proportion by volume of sulphur hexafluoride (or other fluorine compound) to chlorine can vary from 0.01 to 1.0, preferably from 0.05 to 0.5. Usually, an inert carrier gas, such as argon or nitrogen, which can be considered inert under the condition of utilization, will be used with the mixture of chlorine and gaseous fluorine compound.

The proportion of reactive gas mixture to inert carrier gas can vary depending on the amount of alkali and alkaline earth metal to be removed, and will normally vary between 1% or less, up to 50% preferably within the range of 2 to 10%.

The chlorine and the $SF_6$ or other fluorine compound may be added separately to the melt but are preferably mixed before addition. The treatment may conveniently be carried out in conventional equipment such as the commercial in-line units referred to above, simply by including a proportion of sulphur hexafluoride in the treatment gas mixture. Alternatively, the process can be applied to conventional gas fluxing practice in furnace using fluxing tubes. In this condition, the separation of magnesium chloride particulate which is normally found in the melt after the treatment, will be improved for the reason cited below. Due to much less efficient contact between the gas and the liquid aluminium characterizing conventional fluxing operations using injection tubes, porous plugs, lances or different arrangements or injection systems compared to the utilization of rotary gas dispersers, the relative concentration of chlorine gas to the inert carrier is usually in the range of 30-50%. Under these circumstances, $SF_6$ can also be used in the same proportion in relation to the chlorine as cited above.

It was also found that the sulphur present in the $SF_6$ is eliminated from the melt through accumulation and oxidation of aluminium sulphide in the dross layer present at the melt/atmosphere interface during the treatment. Thus, no extra compounds or inclusions are formed during the treatment and metal cleanliness, as well as hydrogen or alkali elements, are not affected by the addition of $SF_6$ to the chlorine-carrier gas stream.

Although this invention is concerned with results and not with mechanisms, we currently believe the basis of the invention to be as follows. By virtue of several physical properties, e.g. high melting point and thermodynamic stability $MgF_2$ combines with the liquid alkali metal chlorides to inhibit their detrimental effect on the oxide film at the liquid aluminium/air interface. The fact that $MgF_2$ is present in the newly formed film barrier in the presence of $SF_6$ clearly indicates the higher stability of the alkali and alkaline earth metal fluorides relative to the chloride compounds which are rapidly attacked and decomposed by hydrolysis at high temperature by the atmosphere. The presence of fluoride, even in small quantity, mixed with molten chloride mixtures is also known to reduce the interfacial tension between the molten salt phase and the liquid aluminium [Journal of Materials Science, 14 (1979) p. 2366]. It is therefore probable that the presence of fluoride even in small quantity assists the separation of the chloride phase during the in-line gas treatment. Both effects produce a very protective oxide film on the surface of molten aluminium and completely eliminate the problem of solid and porous oxide film formation which is the basis of the oxide patches problem during casting.

The exact mechanism by which small $SF_6$ or other reactive gaseous fluorine compound additions to chlorine-argon gas fluxing mixture change the physicochemical characteristics of the oxide film and eliminate the formation of MgO-rich oxide patch problem is not presently fully understood. But these black patches are suppressed in the presence of $MgF_2$.

Al-Mg alloys are understood to be those containing at least 1% Mg, generally 1 to 6% Mg.

EXPERIMENTAL

Tests of the system were made using two types of commercial in-line treatment units. The flow of every component of the gas mixture i.e. Ar, $Cl_2$ and $SF_6$, was measured using individual flow meters leading to each of the multiple gas dispersers of the commercial units used for tests. It can be assumed that the gas mixture was thoroughly mixed before reaching the gas dispersers.

$SF_6$ experiments have been made in two locations on aluminium alloy containing 4 to 5% Mg (4.5% in AA5182).

EXAMPLE 1

Test A was on a commercial treatment unit comprising three gas dispersers in three interconnected treatment chambers. Metal flow rate during casting ranged from 530 to 740 kg Al/min. Chlorine/argon ratios varied from 1% to 5% while $SF_6/Cl_2$ ratios were set from 0.05 to 0.51. Test conditions are given in Table 1. Hydrogen levels before and after gas treatment with $SF_6$ were comparable to those obtained with regular gas mixture. Metallographic examination revealed acceptable metal cleanliness with limited percentage of Mg oxides and chlorides.

It became evident during these trials that none of the compounds previously identified to cause defects ever reached ingot heads or surfaces.

EXAMPLE 2

Test B was performed on another type of commercial treatment unit comprising two gas dispersers in two interconnected treatment chambers. AA5182 (4.5% Mg) was cast at flow rates about 400 kg/min into ingots of cross-section 550×1950 mm. The $SF_6$ test schedule was determined randomly using various combinations of $Cl_2/Ar$ (1%, 3%, 5%) in conjunction with $SF_6/Cl_2$ of 10%, 33% and 50% with nine possible combinations to be evaluated. In order to ensure any effects produced by the $SF_6$ gas were not a coincidence, control casts using $Cl_2$ and argon were randomly inserted into the test schedule.

Test conditions and results are given in Table 2. All casts made using $Cl_2$ and $SF_6$ produced ingots with generally good to excellent surface quality. On the contrary, the use of 5% $Cl_2/Ar$ gas mixture without $SF_6$ resulted in heavy oxide patches on cast ingots.

In addition to its effectiveness, the use of $SF_6$ to solve oxide patch problems also offers the advantages of easy retrofit and operation in existing installations. Process control and reliability are also possible since oxide patch problem is solved at the source. $SF_6$ works directly at the cause of the problem, i.e. the gas mixture of $CL_2$ and reaction with Mg alloy in degassing units. Finally the cost of using $SF_6$ amounts only to a fraction of alternative methods (such as in-line metal filtration) with the additional benefit of $SF_6$ reliability.

TABLE 1

| | $SF_6$ Trials: Example 1 | | | | |
|---|---|---|---|---|---|
| | Test No. | | | | |
| | 1 | 2 | 3 | 4 | 5 |
| Metal Flow Rate (Kg/min) | 740 | 530 | 738 | 590 | 656 |
| Ingot Dimensions (mm) | 635 × 1670 5 ingots | 635 × 1350 4 ingots | 600 × 1820 5 ingots | 600 × 1820 4 ingots | 635 × 1350 5 ingots |
| Metal Temperatures (°C. Treatment Unit) | 702 | 692 | 690-700 | 690-700 | 690-700 |
| Argon (NL/min) | 212 | 212 | 212 | 212 | 212 |
| $Cl_2$ (NL/min) | 4.68 | 10.75 | 4.66 | 2.12 | 4.77 |
| $SF_6$ (NL/min) | 2.4 | 4.45 | 0.78 | 0.71 | 0.24 |
| $Cl_2$ (NL/kg Al) | 0.0063 | 0.0020 | 0.0063 | 0.0030 | 0.0073 |
| $SF_6$ (NL/kg Al) | 0.0032 | 0.0065 | 0.0011 | 0.0012 | 0.0004 |
| % $Cl_2/Ar$ | 2.2 | 5.1 | 2.2 | 1 | 2.25 |
| Ratio $SF_6/Cl_2$ | 0.51 | 0.32 | 0.17 | 0.34 | 0.05 |

TABLE 1-continued

| | SF$_6$ Trials: Example 1 | | | | |
| --- | --- | --- | --- | --- | --- |
| | Test No. | | | | |
| | 1 | 2 | 3 | 4 | 5 |
| Li Bef/Aft (ppm) | <1/<1 | <1/<1 | <1/<1 | <1/<1 | <1/<1 |
| Na Bef/Aft (ppm) | <1/<1 | <1/<1 | <1/<1 | <1/<1 | <1/<1 |
| H$_2$ Bef/Aft (ml/100 g) | 0.25/0.11 | 0.27/0.13 | 0.18/0.09 | 0.22/0.12 | 0.16/0.12 |

TABLE 2

SF$_6$: Trials: Example 2

| TEST | AR MAIN TOTAL INERT NL/MIN | CL$_2$ TOTAL NL/MIN | SF$_6$ TOTAL NL/MIN | CL$_2$ NL/KG Al | SF$_6$ NL/KG Al | RATIO Cl$_2$ ARGON % | RATIO SF$_6$/ CL$_2$ | INGOT QUALITY OBSERVATIONS |
| --- | --- | --- | --- | --- | --- | --- | --- | --- |
| 6 | 295 | 8.84 | .89 | .0219 | .0022 | 3% | .10 | Good Surface |
| 7 | 295 | 2.96 | 1.48 | .0073 | .0037 | 1% | .50 | Good Surface |
| 8 | 295 | 14.73 | 4.08 | .0365 | .0121 | 5% | .33 | Good Surface |
| 9 | 295 | 8.84 | 4.43 | .0219 | .0110 | 3% | .50 | Good Surface |
| 10 | 295 | 2.96 | — | .0073 | — | 1% | — | Some Oxide Patches |
| 11 | 295 | 2.96 | .30 | .0073 | .0007 | 1% | .10 | |
| 12 | 295 | 8.84 | 2.92 | .0219 | .0072 | 3% | .33 | Excellent Surface |
| 13 | 295 | 8.84 | — | .0219 | — | 3% | — | |
| 14 | 295 | 14.73 | 7.38 | .0365 | .0183 | 5% | .50 | Good Surface |
| 15 | 295 | 2.96 | .97 | .0073 | .0024 | 1% | .33 | |
| 16 | 295 | 14.73 | — | .0365 | — | 5% | — | Many Oxide Patches |
| 17 | 295 | 14.73 | 1.48 | .0365 | .0037 | 5% | .10 | |
| 18 | 295 | 14.73 | 7.38 | .0365 | .0183 | 5% | .50 | Good Surface |

EXAMPLE 3

Tests were made on a static body of alloy in an experimental foundry. A single skimmings sample was removed from the metal surface after completion of the final test and examined by x-ray diffraction and x-ray fluorescence. Test conditions were as follows:
Alloy nominal composition: Al–4.5% Mg
Weight of molten alloy body: approx. 135 kg
Temperature of molten alloy body: 690°–700° C.

| | | Gas Flow (l/min at STP) | | | |
| --- | --- | --- | --- | --- | --- |
| Test No. | Duration (min.) | Ar | Cl$_2$ | SiF$_4$ | |
| 1 | 3 | 25 | 0.25 | 0.025 | (10%) |
| 2 | 3 | 25 | 0.25 | 0.10 | (40%) |
| 3 | 3 | 25 | 1.25 | 0.125 | (10%) |
| 4 | 3 | 25 | 1.25 | 0.50 | (40%) |
| 5 | 4 | 0 | 3.0 | 1.0 | (33%) |

XRD results were as follows:

| MAJOR | Aluminium nitride | AlN |
| --- | --- | --- |
| MEDIUM | Spinel | MgAl$_2$O$_4$ |
| MINOR | Periclase | MgO |
| MINOR | Aluminium | Al |
| MINOR | Sellaite | MgF$_2$ |

In addition, fluorine content was determined by XRF at 1.42%.

The main reason for varying the proportions of chlorine and SiF$_4$ in the tests was to observe if any adverse environmental effects occurred. None were observed.

Although the single dross sample taken did not distinguish between the various proportions of gases used, confirmation of the presence of magnesium fluoride was obtained, which is the requirement for suppression of black patches.

We claim:

1. In a method of treating a molten aluminium alloy in which magnesium is present in a concentration of at least 1% and is the principal alloying element by continuous in-line fluxing with chlorine gas to remove hydrogen and/or alkaline metal impurities from the molten alloy wherein the said fluxing of the molten alloy with chlorine gas also causes the formation of magnesium chloride in the molten alloy, the improvement wherein the said fluxing is carried out using chlorine gas premixed prior to said fluxing with a gaseous compound of fluorine other than a halogenated hydrocarbon whereby surface oxidation of said magnesium chloride formed during said fluxing is substantially eliminated during subsequent transfer and/or casting of said alloy, the proportion by volume of the gaseous fluoride compound to chlorine gas used being from 0.01 to 1.0.

2. A method as claimed in claim 1, wherein the gaseous compound of fluorine is sulphur hexafluoride.

3. A method as claimed in claim 1, wherein the chlorine and the compound of fluorine are diluted by an inert carrier gas.

4. A method as claimed in claim 1, including the step of casting the treated metal in a casting mould to form an ingot, wherein the treatment is carried out in such a way that oxide patches are not formed within the casting mould on the molten metal surface, nor on the surface of the ingot during the casting operation.

5. A method as claimed in claim 1, wherein the gaseous compound of fluorine is silicon tetrafluoride.

6. A method as claimed in claim 1, including the step of casting the treated molten alloy in a mould within which a surface of the molten alloy is exposed such that oxidation can occur at said surface.

* * * * *